J. O. SHAFER.
BAND WHEEL SUPPORTING MEANS.
APPLICATION FILED NOV. 6, 1914.
1,145,621.   Patented July 6, 1915.
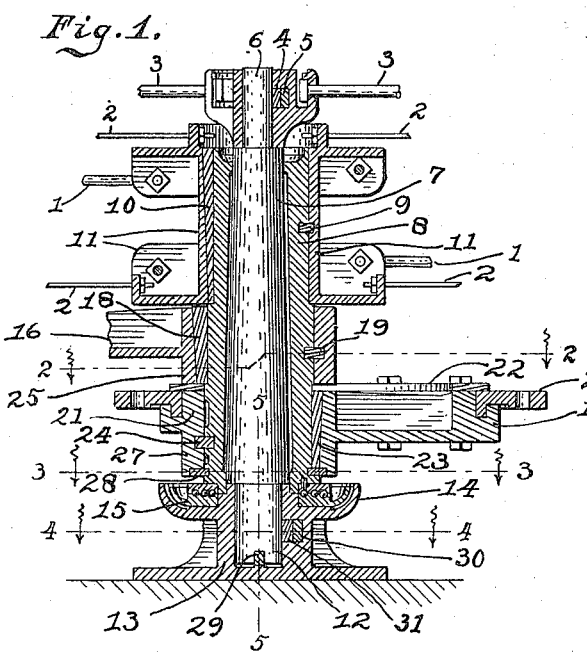
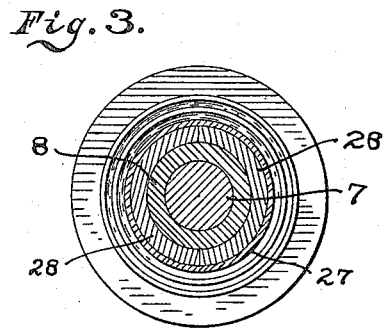
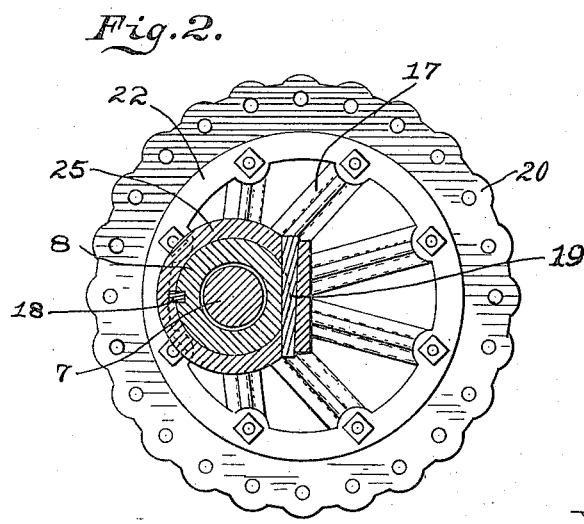
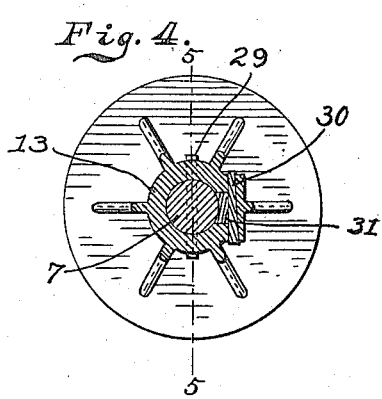
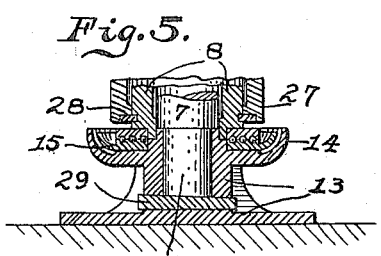
Witnesses
Chas. N. Leonard.
A. C. Rice.
Inventor
Jesse O. Shafer
By Bradford & Doolittle
Attorneys

UNITED STATES PATENT OFFICE.

JESSE O. SHAFER, OF BLUFFTON, INDIANA, ASSIGNOR TO THE GEORGE W. GRIMES COMPANY, OF BLUFFTON, INDIANA, A CORPORATION OF INDIANA.

BAND-WHEEL-SUPPORTING MEANS.

1,145,621.                Specification of Letters Patent.        Patented July 6, 1915.

Original application filed May 29, 1914, Serial No. 841,878. Divided and this application filed November 6, 1914. Serial No. 870,591.

*To all whom it may concern:*

Be it known that I, JESSE O. SHAFER, a citizen of the United States, residing at Bluffton, Wells county, and State of Indiana, have invented and discovered certain new and useful Improvements in Band-Wheel-Supporting Means, of which the following is a specification.

My invention relates to supporting means for band wheels, employed in the power transmission mechanisms of oil well pumps.

This application is a division of my application, Serial No. 841,878 filed May 29, 1914, for pump transmission mechanisms.

The object of the invention is to provide means whereby the standard of the wheel may be vertically adjusted and rigidly locked in adjusted position.

With this object in view my invention is embodied in preferable form in the construction hereinafter described and illustrated in the accompanying drawings.

In these drawings, Figure 1 is a vertical section of part of a band wheel used in transmission mechanism for oil well pumps, and of the wheel supporting means; Fig. 2, a section on the line 2—2 of Fig. 1; Fig. 3, a section on the line 3—3 of Fig. 1; Fig. 4, a section on the line 4—4 of Fig. 1; Fig. 5, a section on the line 5—5 of Fig. 1.

Referring to the drawings, 1 indicates the driver spokes and 2 the tension spokes of a band wheel, the rim of which is not shown. Guy rods 3 are connected to a sleeve which is fixed by keys 4, 5, on the upper stem 6 of a fixed supporting post or standard 7 around which is adapted to rotate a wheel supporting sleeve 8 to which is secured by horizontal and vertical keys 9 and 10, a vertically elongated hub 11 of the band wheel, to which hub are suitably fastened the inner ends of the wheel spokes.

The lower end of the standard or post is provided with a reduced stem 12 which fits within a socket formed in a fixed and rigid base member 13. This base member has an upper cup-shaped portion 14 in which are mounted suitable ball bearings 15, the upper half of which bearings is adapted to receive the lower face of the rotatable sleeve 8.

The sleeve 8 is adapted to drive a pair of upper and lower eccentrics 16 and 17 from which power is to be transmitted to a plurality of well rigs. The upper eccentric 16 is keyed to the sleeve 8 by a vertical key 18 and a horizontal key 19. The lower eccentric is shown more in detail particularly in Fig. 2 and it comprises the rim portion 20, hub 21 and a strengthening ring 22. A vertical key 23 connects the hub of the wheel with the sleeve 8, and a horizontal releasable key 24 also serves to connect the hub and sleeve. This releasable horizontal key enables the parts to be readily separated by driving the key out of its socket by the blows of a hammer. The hub of the eccentric wheel 16 has a downward prolongation 25 which rests upon the ring 22 and similarly the hub 21 is provided with a downward prolongation 27. This prolongation 27 of the hub 22 is adapted to rest upon the two halves of a split ring 28 which is seated partly in a recess formed in the lower portion of said prolongation and partly in a recess formed in the sleeve 8. By means of this arrangement after the horizontal keys connecting the eccentrics with the sleeve 8 have been removed or loosened, the eccentrics may be raised slightly and the two halves of the ring 28 withdrawn, thus permitting the withdrawal downward of the eccentrics with respect to the post 7 when said post has been released from its supporting base, which operation enables the eccentrics to be removed for repair or replacement without removing the band wheel, such as has been customarily required, owing to the fact that heretofore provision has been made only for removing said eccentrics upwardly, thus requiring first the removal of the band wheel.

In the lower part of the fixed post 7 is mounted a horizontally extending wedge shaped key 29, tapered in a vertical plane from a horizontal plane and which connects said post with the base 13 and the function of which is to permit of a slight upward adjustment of the post by driving the wedge into the post and base a greater or less distance, for the purpose of taking up wear in sleeve. With the post adjustably mounted and having connection to the base solely through said key, and supported relative to the base only by the key, the desired rigidity of connection between base and post cannot be obtained, hence I provide in association with said vertically sloping wedge-shaped key 29, a wedge-shaped key 30 tapered in a horizontal plane, which is adapted to fit against a small key or clamping block 31 which bears rigidly against the reduced portion of the post. Said key 30 and block 31 serve to hold said post rigidly to the base member in any position to which the post may be adjusted by means of the wedge key 29. The wedge key and block are mounted a considerable distance above the key 29 and afford means additional to the latter key for rigidly connecting the post and base. The key 30 is readily accessible and the post and base may be released from engagement by loosening said key and the standard may be then readily adjusted by means of the key 29.

Having thus described my invention, what I claim is:—

1. In combination with a band wheel, a rotating member to which said band wheel is fixed, a fixed supporting post on which said rotating member is mounted, a base in which said post is supported, common means to rigidly connect and to adjust said post vertically with respect to said base and means additional to said first means for locking said post rigidly to the base in adjusted position, substantially as described.

2. In combination with a band wheel, a rotating member to which said band wheel is fixed, a fixed post for supporting said rotating member, a base member for receiving said post, a wedge key tapered in a vertical plane and resting upon the base and entering a slot in the lower end of the post and connecting said post and said base member for the purpose of enabling the post to be raised by the adjustment of said key and a key tapered in a horizontal plane and mounted above the first key for locking said post to the base member in adjusted position, substantially as described.

In witness whereof, I have hereunto set my hand and seal at Bluffton, Wells county, Indiana, this 28th day of October, A. D. nineteen hundred and fourteen.

JESSE O. SHAFER. [L. S.]

Witnesses:
 EDGAR G. COTTINGHAM,
 ROBT. BARR.

Copies of this patent may be obtained for five cents each, by addressing the "Commissioner of Patents. Washington, D. C."